(12) United States Patent
Copsey

(10) Patent No.: US 9,563,690 B2
(45) Date of Patent: Feb. 7, 2017

(54) SYSTEM AND METHOD FOR FEATURE RECOGNITION AND DOCUMENT SEARCHING BASED ON FEATURE RECOGNITION

(71) Applicant: Open Text S.A., Luxembourg (LU)

(72) Inventor: Simon Dominic Copsey, Horsham (GB)

(73) Assignee: Open Text SA ULC, Halifax (CA)

( * ) Notice: Subject to any disclaimer, the term of this patent is extended or adjusted under 35 U.S.C. 154(b) by 0 days.

(21) Appl. No.: 15/098,923

(22) Filed: Apr. 14, 2016

(65) Prior Publication Data

US 2016/0232228 A1 Aug. 11, 2016

Related U.S. Application Data

(63) Continuation of application No. 14/322,591, filed on Jul. 2, 2014, now Pat. No. 9,342,533.

(60) Provisional application No. 61/842,138, filed on Jul. 2, 2013.

(51) Int. Cl.
  *G06K 9/18* (2006.01)
  *G06F 17/30* (2006.01)
  *G06K 9/00* (2006.01)
  *G06K 9/22* (2006.01)

(52) U.S. Cl.
  CPC ... *G06F 17/30598* (2013.01); *G06F 17/30253* (2013.01); *G06F 17/30477* (2013.01); *G06K 9/00442* (2013.01); *G06K 9/228* (2013.01)

(58) Field of Classification Search
  None
  See application file for complete search history.

(56) References Cited

U.S. PATENT DOCUMENTS

| | | | |
|---|---|---|---|
| 6,304,313 B1 | 10/2001 | Honma | |
| 9,342,533 B2 | 5/2016 | Copsey | |
| 2003/0169923 A1 | 9/2003 | Butterworth | |
| 2005/0223030 A1* | 10/2005 | Morris | G06F 17/30241 |

(Continued)

FOREIGN PATENT DOCUMENTS

| | | |
|---|---|---|
| EP | 1411460 A2 | 4/2004 |
| EP | 2439676 A1 | 4/2012 |

(Continued)

OTHER PUBLICATIONS

European Search Report for European Patent Application No. EP 13174929.3, dated Jun. 28, 2014, 9 pages.

(Continued)

*Primary Examiner* — Sumati Lefkowitz
*Assistant Examiner* — David Perlman
(74) *Attorney, Agent, or Firm* — Sprinkle IP Law Group

(57) ABSTRACT

A system for document searching can include a camera. The system may further include an image capturing module configured to capture a first image of a first portion of a document, a feature recognition module in communication with the image capturing module, the feature recognition module configured to determine a first feature associated with the first image, a search module configured to send search information to a server and receive a first result from a first search of a set of documents that was performed based on one or more search criteria determined based on the first feature associated with the first image, and a search interface configured to present the first result on the device.

20 Claims, 8 Drawing Sheets

(56) References Cited

U.S. PATENT DOCUMENTS

| | | |
|---|---|---|
| 2005/0286493 A1 | 12/2005 | Angelhag |
| 2006/0015337 A1 | 1/2006 | Kurzweil et al. |
| 2006/0142054 A1 | 6/2006 | Wang et al. |
| 2008/0094496 A1 | 4/2008 | Wang et al. |
| 2008/0118162 A1 | 5/2008 | Siegemund |
| 2009/0285492 A1 | 11/2009 | Ramanujapuram et al. |
| 2012/0128251 A1 | 5/2012 | Petrou et al. |
| 2012/0274803 A1 | 11/2012 | Nako et al. |
| 2013/0094697 A1 | 4/2013 | Adcock et al. |
| 2015/0010235 A1 | 1/2015 | Copsey |

FOREIGN PATENT DOCUMENTS

| | | |
|---|---|---|
| WO | WO 2009115855 A1 | 9/2009 |
| WO | WO 2012090033 A1 | 7/2012 |

OTHER PUBLICATIONS

Office Action issued for U.S. Appl. No. 14/322,591, mailed Apr. 22, 2015, 27 pages.
Office Action issued for U.S. Appl. No. 14/322,591, mailed Oct. 26, 2015, 20 pages.
Notice of Allowance issued for U.S. Appl. No. 14/322,591, mailed Jan. 21, 2016, 11 pages.
Supplemental Notice of Allowance issued for U.S. Appl. No. 14/322,591, mailed Apr. 11, 2016, 3 pages.

* cited by examiner

SYSTEM AND METHOD FOR FEATURE
RECOGNITION AND DOCUMENT
SEARCHING BASED ON FEATURE
RECOGNITION

CROSS REFERENCE TO RELATED
APPLICATIONS

This application is a continuation of and claims a benefit of priority from U.S. patent application Ser. No. 14/322,591, filed Jul. 2, 2014, entitled "SYSTEM AND METHOD FOR FEATURE RECOGNITION AND DOCUMENT SEARCHING BASED ON FEATURE RECOGNITION, issued as U.S. Pat. No. 9,342,533," which claims benefit of priority to U.S. Provisional Patent Application Ser. No. 61/842,138, filed Jul. 2, 2013, entitled "SYSTEM AND METHOD FOR OPTICAL CHARACTER RECOGNITION AND DOCUMENT SEARCHING BASED ON OPTICAL CHARACTER RECOGNITION," the entire contents of which are hereby expressly incorporated by reference for all purposes.

TECHNICAL FIELD

This disclosure relates generally to systems and methods for performing optical character recognition and using the results of such optical character recognition. Specifically, this disclosure relates to systems and methods for performing optical character recognition on a device and systems and methods for searching documents based on optical character recognition.

BACKGROUND

While technology utilized today has led to widespread use of electronic documents in certain environments, paper documents have not been completely exorcised. As a result, in many environments both electronic documents and paper documents may be utilized. The simultaneous use of paper and electronic documents has imposed an inconvenient and oft-clumsy segregation with respect to the searching of such documents.

To illustrate, there may be a wide variety of ways in which to search electronic documents. For example, in many cases electronic documents may be managed by a content management system which provides an interface that may be utilized to search those documents (e.g., by keywords, content, etc.). Additionally, electronic documents that may reside at multiple disparate locations may be indexed and the index of those documents used to search document. Thus, once a desired electronic document is obtained (e.g., through searching or otherwise) the content of that electronic document may be used to search other electronic documents for other electronic documents that may be similar (e.g., with respect to terms contained, content, etc.).

Paper documents may also be searched. In many cases, paper documents may be organized (alphabetized, catalogued according to an organizational system, etc.) such that those paper documents may be searched or otherwise located. Again, then, once a desired paper document is obtained (e.g., through searching or otherwise) the content of that paper document may be used to search other paper documents that may be similar (e.g., through manual searching of those paper documents).

In environments that utilize both paper documents and electronic documents it is oftentimes desired to find electronic documents based on a paper documents. Currently, the only way to perform such a search is to manually review a paper document and use a provided search interface to manually perform a search of the electronic documents based on the manual review of the paper documents.

What is desired then, are systems and methods that allow electronic documents to be searched based on paper documents. In essence, a more seamless connection between physical paper documents and the ability to search, find, and utilize corresponding or associated electronic documents.

SUMMARY

A method for document searching, in accordance with embodiments includes capturing a first image of a first portion of a document with a camera of a device; determining a first feature associated with the first image; sending search information from the device to a server; receiving a first result from a first search of a set of documents that was performed based on one or more search criteria determined based on the first feature associated with the first image; and presenting the first result on the device.

In some embodiments, the first feature comprises at least one of text, document layout, or document formatting. In some embodiments, determining the first feature associated with the first image comprises performing optical character recognition on the first image to recognize text in the first image, wherein the first feature comprises text. In some embodiments, the search criteria comprise a search term formed from the recognized text.

In some embodiments, the method includes forming a search query comprising the search term at the device, sending the search query to the server, the search information comprising the search query and receiving the first result from the server in response to the search query.

In some embodiments, the method includes sending the recognized text to a server, the search information comprising the recognized text; forming a search query for the first search at the server based on the recognized text; performing the first search according to the search query; and returning the first result from the server to the device.

In some embodiments, the method includes capturing a set of images of the document with the camera, wherein the first image is captured as one of the set of images; determining a set of features by performing optical character recognition (OCR) on the set of images, wherein the first feature is one of the set of features; determining an overall feature associated with the set of images, wherein determining the overall feature comprises joining at least the first feature associated with the first image of the set of images to a second feature associated with a second image of the set of images; and determining the one or more search criteria based on the overall feature.

In some embodiments, sending search information from the device to the server comprises sending the set of images from the device to a content provisioning platform that performs the OCR on the set of images and the determines the one or more search criteria. In some embodiments, the performing of OCR on the set of images and the determination of the one or more search criteria is performed at the device and the first search is performed by a content provisioning platform. In some embodiments, the overall feature and the first and second feature comprise text features and determining the first and second features and overall feature comprises using natural language processing to identify text features. In some embodiments, the method includes capturing a second image of a second portion of the document and receiving a second result from a second search of the set of documents based on the second image of the second portion.

A system for document searching in accordance with embodiments includes a camera; a processor; a computer readable medium storing a set of computer instructions executable by the processor to provide: an image capturing module configured to capture a first image of a first portion of a document; a feature recognition module in communication with the image capturing module, the feature recognition module configured to determine a first feature associated with the first image; a search module configured to send search information to a server and receive a first result from a first search of a set of documents that was performed based on one or more search criteria determined based on the first feature associated with the first image; and a search interface configured to present the first result on the device.

In some embodiments, the first feature comprises at least one of text, document layout, and document formatting. In some embodiments, the feature recognition module comprises an optical character recognition (OCR) module configured to recognize text, wherein the first feature comprises recognized text. In some embodiments, the device comprises a search criteria module configured to determine the one or more search criteria from the first feature, wherein the one or more search criteria comprise a search term and the search information comprises the one or more search criteria.

In some embodiments, the system includes a content provisioning platform coupled to the device. In some embodiments, the search information comprises the recognized text and the content provisioning platform is configured to perform searches and return search results, wherein the first search is performed by the content provisioning platform and the first results returned by the content provisioning platform. In some embodiments, the device comprises a search criteria module configured to determine the one or more search criteria from the recognized text; the device is configured to provide the one or more search criteria to the content provisioning platform by sending the search information to the server; and the content provisioning platform is configured to perform searches and return search results, wherein the first search is performed by the content provisioning platform and the first results returned by the content provisioning platform.

In some embodiments, the first image is one of a set of images of the document, each of the set of images is associated with the document; the feature recognition module is configured to: perform optical character recognition (OCR) on the set of images to recognize a set of features, wherein the first image is one of the set of images and the first feature is one of the set of features; and determine an overall feature associated with the set of images, wherein determining the overall feature comprises joining at least the first feature associated with the first image of the set of images to a second feature associated with a second image of the set of images.

In some embodiments, the device comprises a search criteria module configured to determine the one or more search criteria based on the overall feature, wherein the search information comprises the one or more search criteria. In some embodiments, the device is configured to provide the one or more search criteria to the content provisioning platform by sending the search information to the server and the content provisioning platform is configured to perform the first search and return the first result to the device. In some embodiments, the device is configured to provide the overall feature to the content provisioning platform by sending the search information to the server and the content provisioning platform is configured to perform the first search and return the first result to the device. In some embodiments, the overall feature and the first and second feature comprise text features and determining the first and second features and overall feature comprises using natural language processing to identify textual features. In some embodiments, the device is further configured for capturing a second image of a second portion of the document and receiving a second result from a second search of the set of documents based on the second image of the second portion.

A method for performing optical character recognition (OCR), in accordance with embodiments includes receiving a set of images of a set of portions of a document captured with a camera of a mobile device; determining a set of texts by performing optical character recognition (OCR) on the set of images, wherein each of the set of texts is associated with a corresponding image of the set of images; determining an overall text associated with the set of images, wherein determining the overall text comprises joining at least a first text associated with a first image of the set of images to a second text associated with a second image of the set of images; and storing an OCR version of the document that includes the overall text.

In some embodiments, the overall text is determined based on overlapping text that is present in the first text and the second text. In some embodiments, determining the overall text comprises performing natural language processing on the first text and the second text to join the first text and the second text. In some embodiments, the method includes collecting motion data associated with the set of images, wherein the overall text is determined based on motion data associated with the first image and the second image.

A system for optical character recognition of documents in accordance with embodiments includes a mobile device camera; a processor; a set of computer executable instructions stored on a non-transitory computer readable medium, the set of computer executable instructions executable by the processor to perform a method including: capturing a set of images of a document using the camera; determining a set of texts by performing optical character recognition (OCR) on the set of images, wherein each of the set of texts is associated with a corresponding image of the set of images; determining an overall text associated with the set of images, wherein determining the overall text comprises joining at least a first text associated with a first image of the set of images to a second text associated with a second image of the set of images; and storing an OCR version of the document containing the overall text.

In some embodiments, the overall text is generated based on overlapping text that is present in the first text and the second text. In some embodiments, generating the overall text comprises performing natural language processing on the first text and the second text. In some embodiments, the method further includes capturing motion data associated with the set of images and wherein the overall text is determined based on motion data associated with the first image and the second image.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

DETAILED DESCRIPTION

Figure 1:
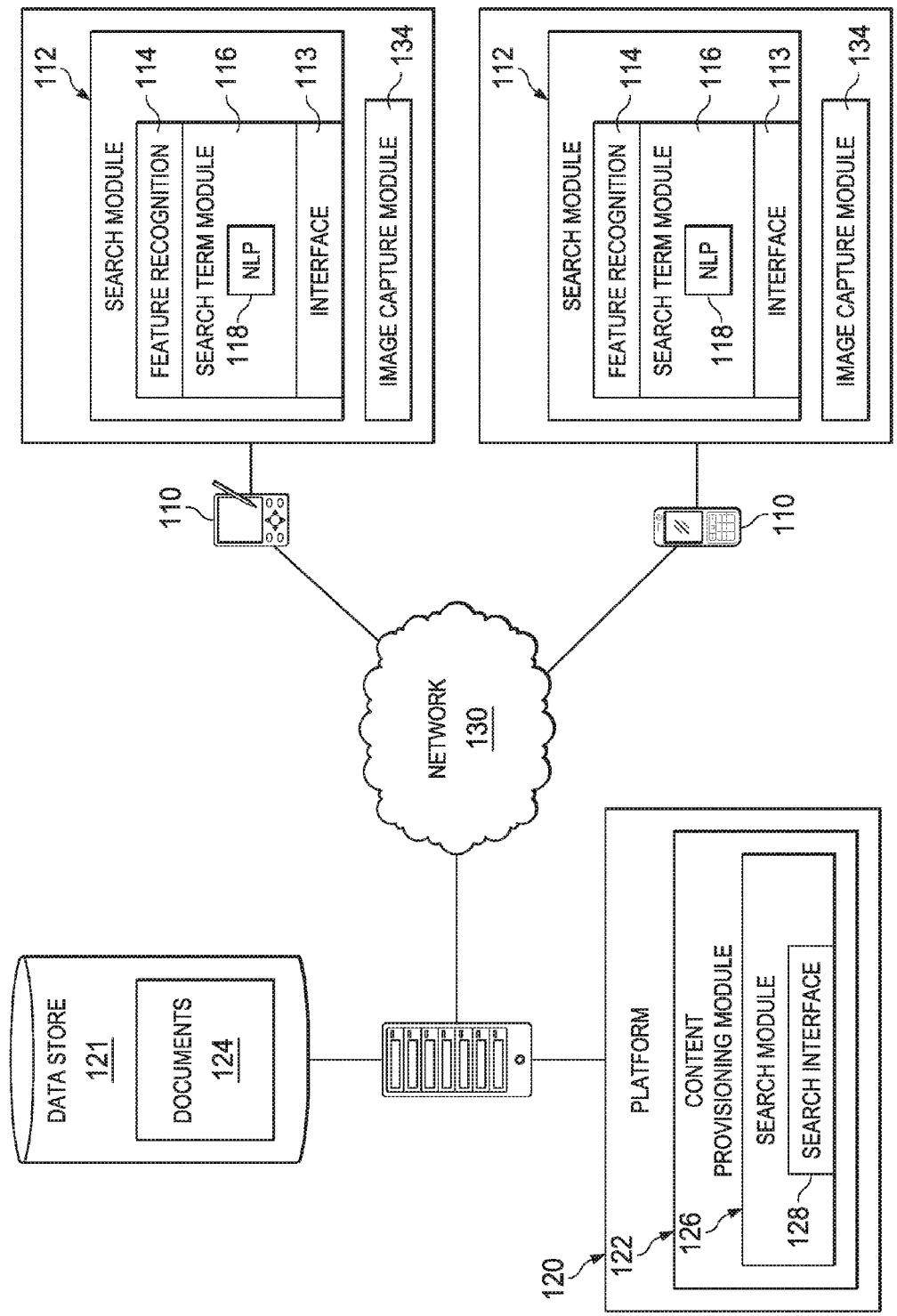
FIG. 1 is a block diagram illustrating one embodiment of a topology for document searching.

Embodiments and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

Embodiments as disclosed may allow the searching of electronic documents based on a paper document. In particular, according to certain embodiments, an image of a paper document (or a portion thereof) may be captured on a device. From the image, a feature may be extracted. Such features may include, for example, text, document layout, document formatting, a pattern of the spaces between words or other feature.

For example, optical character recognition (OCR) may be performed on the image to determine text of the image of the paper document. Based on the determined text, a set of search terms may be determined and a search performed on a set of electronic documents using these search terms. The results of the search may then be returned.

In some embodiments, a set of features is determined from a set of images by using OCR. From these, an overall feature may be determined. Determining such an overall feature may include joining a feature from a first image with a feature from a second image. The one or more search criteria may be determined based on the resulting overall feature. The results of the search may then be returned. In some embodiments, the features from the first and second images are text features and the overall feature is identified therefrom using natural language processing.

Depending on the embodiment, the OCR may be performed at a user device that also captures the images. The device may then determine the search criteria and send them to a content provisioning platform to perform the searching. In other embodiments, images are sent from the device to the content provisioning platform, which then performs the OCR and determination of the search criteria.

In some embodiments, a first search may be performed based on a first image (or set of images) captured from a first portion of a document and a second search may be performed based on a second image (or set of images) of a second portion of the document.

The results, which may be a set of documents responsive to the search, may be returned in a variety of ways. For example, in certain embodiments the electronic documents found through the search may be returned to the device on which the image was captured and displayed in a list. Alternatively, a set of links to the documents (e.g., in a content server or at the locations at which the documents reside may be returned and displayed to the user of the device.

Moreover, in one embodiment, the results of the search may be displayed in conjunction with the image of the paper document on the device (e.g., as a list, set of links, initial sentence of each electronic document, etc. overlaid on top of the image on the screen at the user's device). Using embodiments such as these then, an interactive search that may be substantially continuously updated based on the image a user is currently viewing may be implemented.

For example, in certain embodiments, as a user moves his device over different portions of the paper document, and a portion of the paper document is displayed to the user on the user's device, a search is performed based upon the current portion of the paper document being displayed on the user's device. The results are displayed to the user in conjunction with that portion of the document being currently displayed (e.g., overlaid on top of the image of that portion of the document on the screen). Thus, as the user moves his device over different portions of the document the search results indicating electronic documents associated with those different portions may be shown to the user and substantially constantly updated as the user moves his device to those different portions.

As may be realized, mobile computing devices (or just mobile devices) such as cellular phones, smart phones, laptops, PDA's, etc., are increasingly the way users conduct a wide variety of their interactions. As such, many of the images used to perform embodiments as presented herein may be captured and processed on a mobile device. However, currently a number of impediments to doing OCR on mobile devices exist, including, for example, relatively inferior camera performance or sensors (e.g., poor low light performance), the ability of the camera (or other image capture device) on most mobile devices to capture images where the entire image is in focus, the ability of current OCR technologies to deal with images that are skewed or rotated and the large processing power required to perform OCR on a captured image. Thus, currently, performing OCR of a document on a mobile device may take an inordinately long time or may fail altogether.

Despite these impediments, however, it is still desired to perform image capture and OCR on or for mobile devices. Accordingly, systems and methods to effectively implement OCR in conjunction with a mobile device are presented herein. Specifically, according to certain embodiments, a set of images of a document may be captured, where each image may be of a portion of the document. The portion of the document may be a portion of a page such that the image does not capture the entire page. OCR may be performed on each of these images and the text or other feature resulting from performing OCR on each of the images may be joined to form an overall text or feature corresponding to the images of those portions of the document. Thus, a single overall text for a document may be generated more efficiently by performing OCR on images of a set of portions of the document and joining them together.

In particular, by performing OCR on images that are themselves only portions of a document, issues with respect to lighting and focus of the image when performing such OCR may be considerably reduced (e.g., the text of the images may be much bigger). Moreover, the time to OCR images of portions of a document would also be significantly less than performing OCR of an entire document (for example, as a result of the reduction of the aforementioned issues). Thus, performing OCR on a set of images for portions of a document and joining them together to form an overall text may be performed more quickly and fail less often, than performing OCR on the same portions of the document captured as a single image.

In one embodiment, when the text corresponding to each image of each portion is obtained by OCR the resulting text may be joined by performing language processing (e.g., natural language processing) techniques to analyse the texts obtained from the images to determine how they are to be joined. For example, overlapping text in different images may be used to determine which text should be joined and where. Additionally, in some embodiment, in a similar manner to how predictive text on mobiles works, with an appropriate language database on the device, text from the images could be joined by evaluating probability of text from different images matching.

Additionally, in certain embodiments, other data that may be obtained from the mobile device may be used to inform the joining process. For example, motion data associated with the set of images such as the accelerometer or other motion sensor on the mobile device may be used to determine a direction of movement of the mobile device when the set of images were captured or orientation of the device when the set of images were captured, etc. This motion data may be used when joining the text obtained from the set of images and may further improve both the results and the speed of the joining process. Alternatively, or additionally, in certain embodiments motion data such as movement between images or direction of travel of the device over the document may be determined algorithmically from the image data and the algorithmically determined motion data used during the joining process.

It may now be helpful here to discuss embodiments of various topologies that may be utilized in performing embodiments as disclosed herein. Referring first to FIG. 1, one embodiment of topology for document searching is depicted. The topology includes one or more computing devices 110 connected to a content provisioning platform 120 over a network 130. The network 130 may be a wired or wireless network such as the Internet, an intranet, a LAN, a WAN, a cellular network, another type of network. It will be understood that network 130 may be a combination of multiple different kinds of wired or wireless networks.

Platform 120 may include one or more servers or other computing devices providing content provisioning modules 122 accessible at one or more locations (e.g., IP addresses or domain names) or through one or more interfaces. The modules of a particular platform 120 may be deployed on physical computing devices residing at a particular location (such as those associated with the provider of a particular mobile application) or may be deployed in a cloud. Thus, when a platform 120 is deployed in the cloud, one or more content provisioning modules 122 may be executing on a virtual machine provided in the cloud, where the virtual machine is addressable at a single (or more) location(s).

Regardless of the location of the platform 120, the content provisioning module 122 of a platform 120 may support access from a computing device 110. In other words, users at computing devices 110 may use their computing device 110 to access content provisioning module 122 using for example, a browser or other application on the computing device 110, a proprietary application on computing device, a generic interface, etc. In response to such access, content provisioning module 122 may provide data from data store 121 to the accessing computing device 110. This data may include documents 124, including for example, files in a proprietary format (e.g., Adobe .pdf, Microsoft Word, Excel, Power Point), files in a generic open format (e.g., mp3, mpeg, jpeg, etc.) files in a markup language (XML, HTML etc.) or practically any other type of file. Thus, for example, content provisioning module 122 may be a content management system that provides access, control and management of documents 124 in data store 121.

Accordingly, content provisioning module 122 may include search module 126 including search interface 128 to allow for searching of such documents 124. Device 110 may provide search information to platform 120 for processing. Search interface 128 may be accessible (e.g., at a particular URL, through an API or web services interface, etc.) such that a query including one or more search terms may be provided through the search interface 128. The search module 126 may search the documents 124 based on the query provided through the search interface 126 to determine a set of results responsive to the query, where these results may be associated with a set of documents responsive to the query. These results can then be returned by the search interface 128 in response to the query.

Computing devices 110 may be mobile devices (such as smartphones, laptop computers, personal data assistants (PDAs), etc.), desktop computers, servers, or other computing platforms, or any other type of device that can process instructions and connect to network 130. Each computing device may include an image capture module 134 and a search module 112.

Image capture module 134 may have access to a lens or other aperture on a device configured to receive or capture images using the light received through the aperture. For example, many mobile computing devices include a camera lens or the like and an associated image capture capability which the image capture module 134 can leverage. Thus, image capture module 134 may, when utilized, receive image data (with or without direct user involvement) through the aperture of the device 110 and capture or otherwise provide these images.

Search module 112 may include interface 113, feature recognition module 114 and search term module 116. In some embodiments, the feature recognition module may be an OCR module. Interface 113 may have access to one or more input or output modules (e.g., a screen, buttons, speakers, etc.) on device 110 and be configured to provide output or receive input through these input or output modules of the device 110. Interface 113 may also be configured to utilize other interfaces such as APIs, web service interfaces, etc. to send requests and receive responses to those requests.

Specifically, in one embodiment, interface 113 may be configured to be accessed by a user such that the image currently being received by image capture module 134 is displayed on the screen of the mobile computer device 110. In one embodiment, then, interface 113 may allow a user to indicate that an image (e.g., the image currently being received by the image capture module) is to be used for a search when activated by a user (e.g., when the user selects a particular button or touches a screen in a particular place, etc.). Interface 113 may also be configured to present the results of a search to a user (e.g., in conjunction with an image being displayed to the user or in another type of interface altogether).

The feature recognition module 114 may be configured to identify features of an image. For example, in some embodiments, the feature recognition module may perform OCR on an image, where the result of the OCR of an image is text corresponding to that image. In one embodiment, for example, such an OCR module may be an ABBYY OCR module or the like. In other embodiments, features extracted or recognized can be or include font types or document or image characteristics such as amounts or configurations of whitespace or patterns formed by space between words or other features on a document. In one embodiment, for example, a feature recognition module 114 can be configured to identify the blank areas between words and create of a "fingerprint" for that pattern.

Search term module 116 may be configured to determine one or more search terms from the output of the feature recognition module. In the case of text, for example, search term module 116 may include a natural language processor (NLP) module 118 or the like configured to remove stop words from the text, determine key words or phrases, performing key word or term weighting, etc. Thus, search term module 116 may determine a set of search terms from text by, for example, using all the text (e.g., each term of the text is a search term, or the entire text is one search term), using a set of key words or phrases determined form the text, using the words of the text after removal of stop words or by determining the set of search terms in some other manner.

Search module 112 is thus configured to be activated and to access image capture module 134 to obtain images (e.g., image data) from image capture module 134 and provide these images to interface 113 to be presented to the user. Search module 112 is also configured to receive an indication that a user wishes to use an image currently being displayed for a search. The search module 112 is thus configured to provide the image to feature recognition module 114, receive the text associated with the image from the feature recognition module 114, provide the text to search term module 116, receive the search terms from search term module 116, use interface 113 to provide the search terms to search module 126, receive the results of the search from interface 113 and present the results of the search using interface 113.

Accordingly, a user of computing device 110 may wish to perform a search of documents 124 and activate search module 112 on computing device 110. Search module 112 may then activate image capture module 134 on the device 110 and present the image being received by image capture module 134 to the user through interface 113. The user may then point the device at a portion of a document (e.g., an entire document or less than the entire document) and indicate through interface 113 (e.g., by pressing a button) that the image being currently presented through the interface 113 is to be captured and used for a search.

Search module 112 may then receive the image currently being displayed through the interface 113 using image capture module 134 and provide the image to feature recognition module 114. Feature recognition module 114 may then perform OCR on the captured image to determine text from the image. Search module 112 may then determine a set of search terms from the determined text. In one embodiment, to determine a set of search terms from the text determined from the image, the text may be provided to search term module 116 which may utilize NLP module 118 to determine one or more words or phrases from the determined text. Such determinations may be made, for example, based on frequency, term weighting, removal of stop words or other NLP techniques.

Term weighting techniques, for example, include those known in the art such as term frequency-inverse document frequency (TF-IDF) involving numerical statistics which reflect an importance of a term to a particular document in a document group. Search engines can use TF-IDF as a tool to score and rank term relevance. TF-IDF may include a value that increases proportionally to the number of times a word appears in a document, offset by term frequency in a document group.

Stop-word processing may be used alone or in conjunction with TF-IDF to filter out certain terms or phrases prior to NLP. NLP techniques are further well-known in the art and include, but are not limited to, automatic summarization, co-reference resolution, discourse analysis, machine translation, morphological segmentation, named entity recognition, generation techniques, part-of-speech tagging, parsing techniques, relationship extraction, sentence breakdown, sentiment analysis, topic and speech segmentation, word segmentation, word sense disambiguation, etc. Once the set of search terms are determined, search module 112 may use interface 113 to provide these search terms to search interface 128 of search module 126 of content provisioning module 122. For example, the search terms may be provided to the search module 126 through search interface 128 using an API or web services interface provided by search interface 128. Search module 126 may then utilize the provided search terms to search the documents 124 to obtain a set of search results, where the search results are associated with documents 124 responsive to the search.

These results may be returned to interface 113 through search interface 128 of search module 126 (e.g., in response to the API or web services call received from interface 113). The results returned may, for example, be copies of the documents 124 located through the search (or a subset thereof, such as the top 10 most responsive or closely matched documents, etc.). Alternatively, an identifier (e.g., URL, token, document number, etc.) that may be utilized to locate documents 124 responsive to the search may be returned as a search result, etc.

When the results are received by interface 113 they may be presented to the user at the device 110. For example, a list of the titles or links to each document returned as a search result (or a subset thereof) may be presented allowing a user to select the title and view the corresponding document (e.g., by accessing the document stored on device 110 or by accessing content provisioning module 120 with an identifier of the desired document, etc.). Moreover, in certain embodiments the results of may be displayed through interface 113 in conjunction with the image of the paper document on the device that was utilized in the search (e.g., as a list, set of links, initial sentence of each electronic document, etc. overlaid on top of the image on the screen at the user's device 110).

It should be noted here that while certain embodiments of presenting the results of a search are discussed and presented herein, other configurations for presenting the results of a search may be possible and such configurations are likewise contemplated by this disclosure.

For example, in certain embodiments, an interactive search that may be substantially continuously updated based on the image a user is currently viewing may be implemented. As an example, in one embodiment, as a user moves his device over different portions of the paper document, and a portion of the paper document is displayed to the user on the user's device, a search is performed based upon the current portion of the paper document being displayed on the user's device. The results are displayed to the user in conjunction with that portion of the document being currently displayed (e.g., overlaid on top of the image of that portion of the document on the screen). Thus, as the user moves his device over different portions of the document the search results indicating electronic documents associated with those different portions may be shown to the user and substantially constantly updated as the user moves his device to those different portions.

It can be further noted that, in some embodiments, other features or aspects of the document, such as formatting, logos, graphics, a whitespace fingerprint, or the like may be determined and provided to search module 126 as a search query. For example, a whitespace fingerprint may be used to allow searching against patterns associated with the documents in a document group being searched.

In such embodiments, a user of computing device 110 may wish to perform a search of documents 124 and activate search module 112 on computing device 110. Search module 112 may then activate image capture module 134 on the device 110 and present the image being received by image capture module 134 to the user through interface 113. Search module 112 may then receive the image currently being displayed through the interface 113 using image capture module 134, provide the image to feature recognition module 114, use interface 113 to provide these search terms to search module 126, receive the search results through interface 113 and present the results through interface 113.

The image currently being displayed through the interface 113 may then again be captured using image capture module 134 and used to search documents 124 and display an updated set of search results through interface 113. In this manner, as the user moves the device 110 over a paper document the user may be displayed search results that are substantially associated with the portion of the document currently being displayed to the user.

It should also be noted with respect to embodiments presented herein, that while in certain embodiments feature recognition or OCR may be accomplished on mobile computing devices in conjunction with document searching based on paper document, it is contemplated by other embodiments that such feature recognition or OCR may be performed in other locations, such as at platform 120. Thus, for example, a computing device 110 may send search information to platform 120, where the search information comprises the image(s) of the document and platform 120 performs the operations of recognizing features and determining the search query. In another example, computing device 110 may perform feature recognition (e.g., OCR) and send the features to platform 120 as the search information. Platform 120 can determine the search query from the features provided by client device 110. Thus, the search information provided by search module 112 may include search terms, image(s) of a document, features or other information that platform 120 can use to run a search based on the images captured by image capture module 134. It may be useful here to briefly describe such embodiments.

Figure 2:
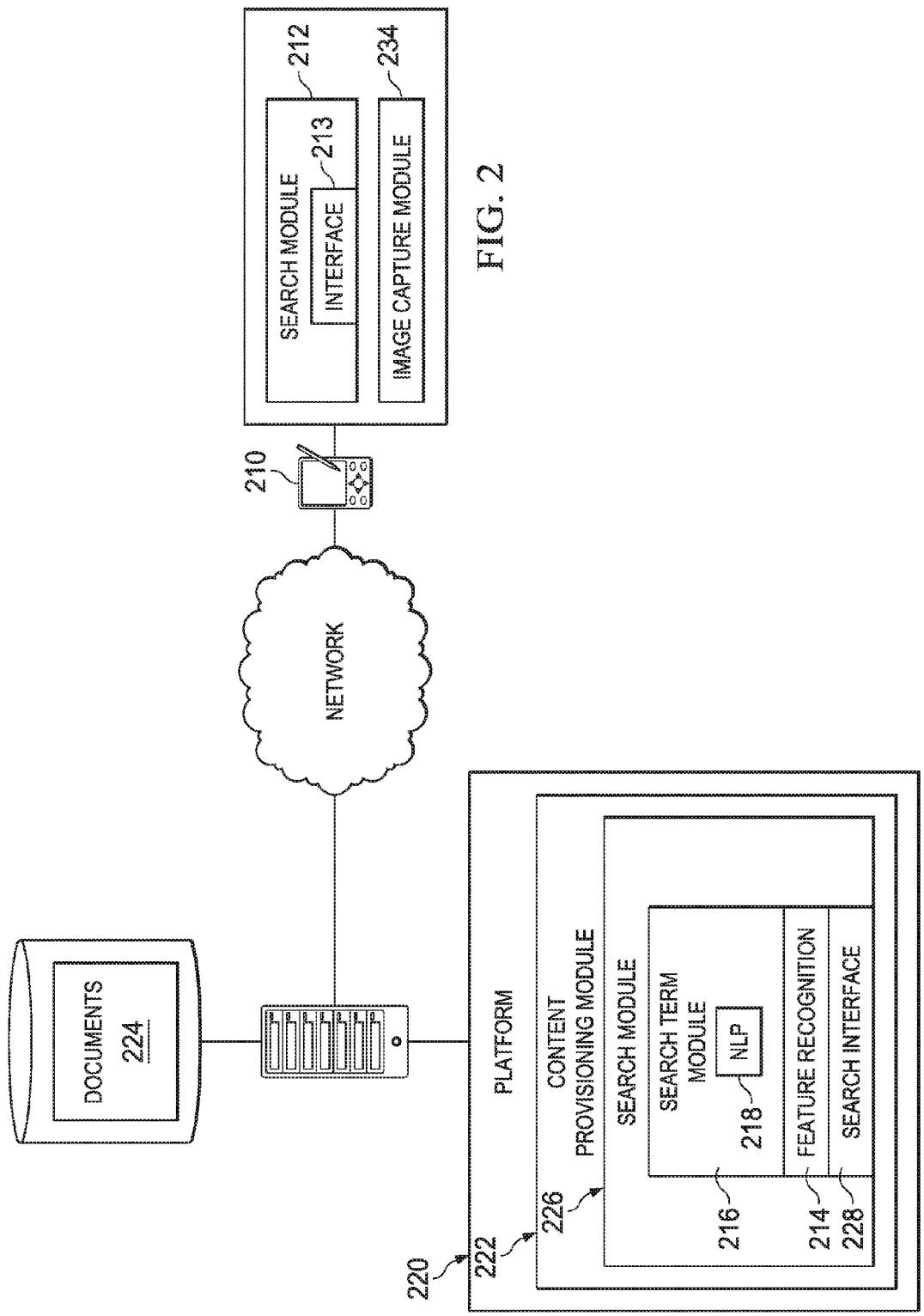
FIG. 2 is a block diagram illustrating one embodiment of a topology for document searching.

FIG. 2 depicts one embodiment of topology for document searching where feature recognition is performed on a location other than the mobile device 210. Here, search module 226 at platform 220 may include search interface 228, search term module 216 and feature recognition module 214. In this embodiment, search interface 228 may be configured to receive (e.g., at a particular URL, through an API or web services interface, etc.) a query including one or more images. The search module 226 may thus be configured to use feature recognition module 214 to perform feature recognition or OCR on the received image to generate text corresponding to the image and to use search term module 216 to determine one or more search terms from this text. Search module 226 can then search the documents 224 based on these search terms to determine a set of results responsive to the query. These results can then be returned through the search interface 228 in response to the query.

Similarly then, in the embodiment depicted, search module 212 may include interface 213, where interface 213 may be configured to be accessed by a user of the mobile device 210 such that the image currently being received by image capture module 234 is displayed on the screen of the mobile computer device 210. In one embodiment, then, interface 213 may allow a user to indicate that an image (e.g., the image currently being received by the image capture module) is to be used for a search when activated by a user (e.g., when the user selects a particular button or touches a screen in a particular place, etc.). Interface 213 may also be configured to present the results of a search to a user (e.g., in conjunction with an image being displayed to the user or in another type of interface altogether).

Search module 212 is thus configured to be activated and to access image capture module 234 to obtain images (e.g., image data) from image capture module 234 and provide these images to interface 213 to be presented to the user. Search module 212 is also configured to receive an indication that a user wishes to use an image currently being displayed for a search. The search module 212 is thus configured to use interface 213 to provide the image to search module 226 using search interface 228, receive the results of the search from interface 213 and present the results of the search using interface 213.

Accordingly, a user of computing device 210 may wish to perform a search of documents 224 and activate search module 212 on computing device 210. Search module 212 may then activate image capture module 234 on the device 210 and present the image being received by image capture module 234 to the user through interface 213. The user may then point the device at a portion of a document (e.g., an entire document or less than the entire document) and indicate through interface 213 (e.g., by pressing a button) that the image being currently presented through the interface 213 is to be captured and used for a search.

Search module 212 may then receive the image currently being displayed through the interface 213 using image capture module 234. Search module 212 may use interface 213 to provide the image to search interface 228 of search module 226 of content provisioning module 222. For example, the image may be provided to the search module 226 through search interface 228 using an API or web services interface provided by search interface 228.

The image may be received at search module 226 through search interface 228. Search module 226 may then provide the image to feature recognition module 214. Feature recognition module 214 may perform feature recognition such as OCR on the captured image to determine text or another feature from the image. Search module 226 may receive the text or feature and provide the text or feature to search term module 216 to determine a set of search terms from the determined text or feature. In one embodiment, to determine a set of search terms from the text, the text may be provided to NLP module 218 to determine one or more words or phrases from the text.

Once the set of search terms are determined, search module 226 may utilize the search terms to search the documents 224 to obtain a set of search results, where the search results are associated with documents 224 responsive to the search. These results may be returned to interface 213 through search interface 228 of search module 226 (e.g., in response to the API or web services call received from interface 213). When the results are received by interface 213 they may be presented to the user at the device 210 as discussed above.

As can be seen then, documents may be searched based on a paper document in certain embodiments by performing feature recognition or OCR on a portion of the paper document and using the resulting text to search the documents, regardless of where the feature recognition or OCR is performed.

As noted above, in another non-limiting embodiment, client computing device can comprise feature recognition module 214. In this case, search module 212 can send features (OCR text or other features) to platform 220 and platform 220 can determine search terms.

Figure 3:
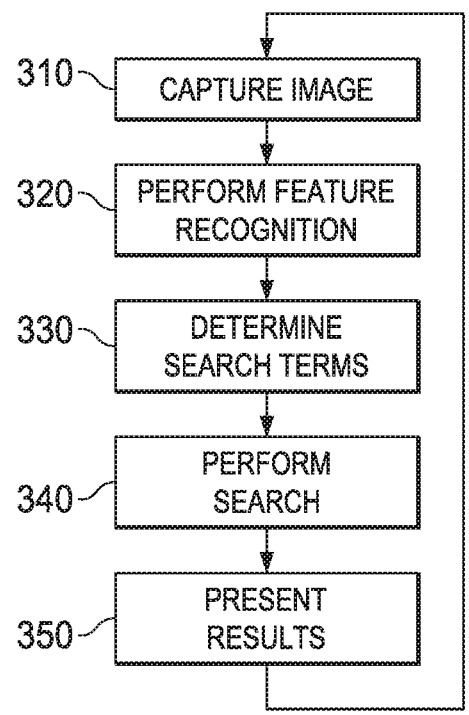
FIG. 3 is a flow diagram illustrating one embodiment of a method for document searching.

Referring now to FIG. 3, one embodiment of a method for searching electronic documents based on paper documents using feature recognition or OCR is depicted. The method of FIG. 3 can be performed by a client computing device acting in conjunction with a server (e.g., a server of a platform). Initially, at step 310 an image is captured on a computing device. This capture may be the reception of the image (e.g., image data) corresponding to the image being received through an image capture device such as a camera or the like on the computing device. The image may be of a portion of a paper document that is to be used to perform the search.

At step 320 feature recognition or OCR may be performed on the captured image. Performing OCR on the captured image may result in text associated with the image of the portion of the paper document (e.g., text that was included in the captured image). In other embodiments, document layout or document formatting may be identified. Using the results of the feature recognition, such as text resulting from the OCR of the captured image, a set of search terms may be determined at step 330. By way of additional example, a document layout or document formatting may be determined and used as search terms to search for comparable documents.

In other embodiments, such as those using OCR, search terms may, for example, be determined using NLP techniques or the like to remove stop words from the text, determine key words or phrases, performing key word or term weighting, etc. Thus, the set of search terms may be determined from the text by, for example, using all the text (e.g., each term of the text is a search term, or the entire text is one search term), using a set of key words or phrases determined form the text, using the words of the text after removal of stop words or by determining the set of search terms in some other manner.

A set of electronic documents can then be searched based on the set of search terms at step 340. It will be realized that the set of documents may be searched based on an index of those documents or the documents themselves may be searched or some other method may be used to search the documents. Thus, embodiments as presented herein may be utilized with equal efficacy in cases where documents are resident in one or more databases such as a database system or content management system or in cases where documents are distributed across a network and an index of such documents is maintained such as in an Internet or internet search engine, etc.

Once the search is performed, the results of that search may be presented at step 350. For example, a list of the titles or links to each document returned as a search result (or a subset thereof) may be presented through a display of the computing device in a manner that allows a user to select the title and view the corresponding document. Moreover, in certain embodiments the results of the search may be displayed through an interface in conjunction with the image of the paper document on the device that was utilized in the search (e.g., as a list, set of links, etc.). In one embodiment, another image may then again be captured at step 310 and used to search documents such that the method is repeated and the search results updated. The steps may be repeated and the search results updated until, for example, the user selects a particular document of the search results to view or otherwise indicates an end to the search.

As discussed above, many of the images used to perform embodiments as presented herein may be captured and processed on a mobile device. However, currently a number of impediments to doing feature recognition or OCR on mobile devices exist, including, for example, relatively inferior camera performance or sensors, the ability of current feature recognition or OCR technologies to deal with images that are skewed or rotated, the large processing power required to perform feature recognition or OCR on a captured image etc. Thus, in many cases performing feature recognition or OCR of a document on a mobile device may take an inordinately long time or may fail altogether.

Despite these impediments, however, it is still desired to perform image capture and feature recognition or OCR on mobile devices. Accordingly, systems and methods to effectively implement feature recognition or OCR on a mobile device are presented herein. Specifically, according to certain embodiments, a set of images of a document may be captured, where each image may be of a portion of the document, where the portion is less than the entire document. Feature recognition or OCR may be performed on each of these images and the text resulting from performing feature recognition or OCR on each of the images joined to form an overall text corresponding to the images of those portions of document. Thus, a single overall text for a document may be generated more efficiently by performing feature recognition or OCR on images of a set of portions of the document and joining them together.

In one embodiment, when the text corresponding to each image of each portion is obtained by OCR the resulting text may be joined by performing language processing (e.g., natural language processing) techniques to analyse the texts obtained from the images to determine how they are to be joined. For example, overlapping text in different images may be used to determine which text should be joined and where.

In some non-limiting embodiments, joining and overlapping text can be determined by searching for commonly found terms/words in different portions of OCR text. Commonly found terms can include matching words, phrases, numbers, characters, symbols and/or tokens such as the sentence tokens such as commas, periods, etc. In some more specific embodiments, a starting text can be identified in a first document and/or OCR portion such that the starting text may be searched for in a second document portion and/or OCR portion by searching each identified text from the second document portion (i.e., a word-by-word comparison search). Upon discovery of a match, a further match can be extended by searching for matching surrounding words. The number of iterations in a surrounding word search may be predetermined. Different portions of texts may be searched as such until a match is found sufficient to join the texts or until all possible text portion combinations are compared.

Additionally, in some embodiment, in a similar manner to how predictive text on mobiles works, with an appropriate language database on the device, text from the images could be joined by evaluating or determining a probability of texts from different images matching.

Additionally, in certain embodiments, other data that may be obtained from the mobile device may be used to inform the joining process. For example, motion data associated with the set of images such as the accelerometer or other motion sensor on the mobile device may be used to determine a direction of movement of the mobile device when the set of images were captured or orientation of the device when the set of images were captured, etc. This motion data may be used when joining the text obtained from the set of images and may further improve both the results and the speed of the joining process. For example, the motion data associated with the set of images may indicate an order of the images. Documents can be identified for further processing based on relative movements of pixels on the screen, in some cases a group of pixels identified as corresponding to a distinct document. Relative movements may take into account angular dispositions (i.e., from different oblique views), relative dimensional movements, etc.

Alternatively, or additionally, in certain embodiments motion data such as movement between images or direction of travel of the device over the document) may be determined algorithmically (e.g., mathematically) from the image data and the determined motion data used during the joining process. In some instances, an accelerometer may be used to determine device travel as well as device rotation in order to map such information to a different set of captured images so that such data can be used to analyse and form a basis for document recognition.

Figure 4:
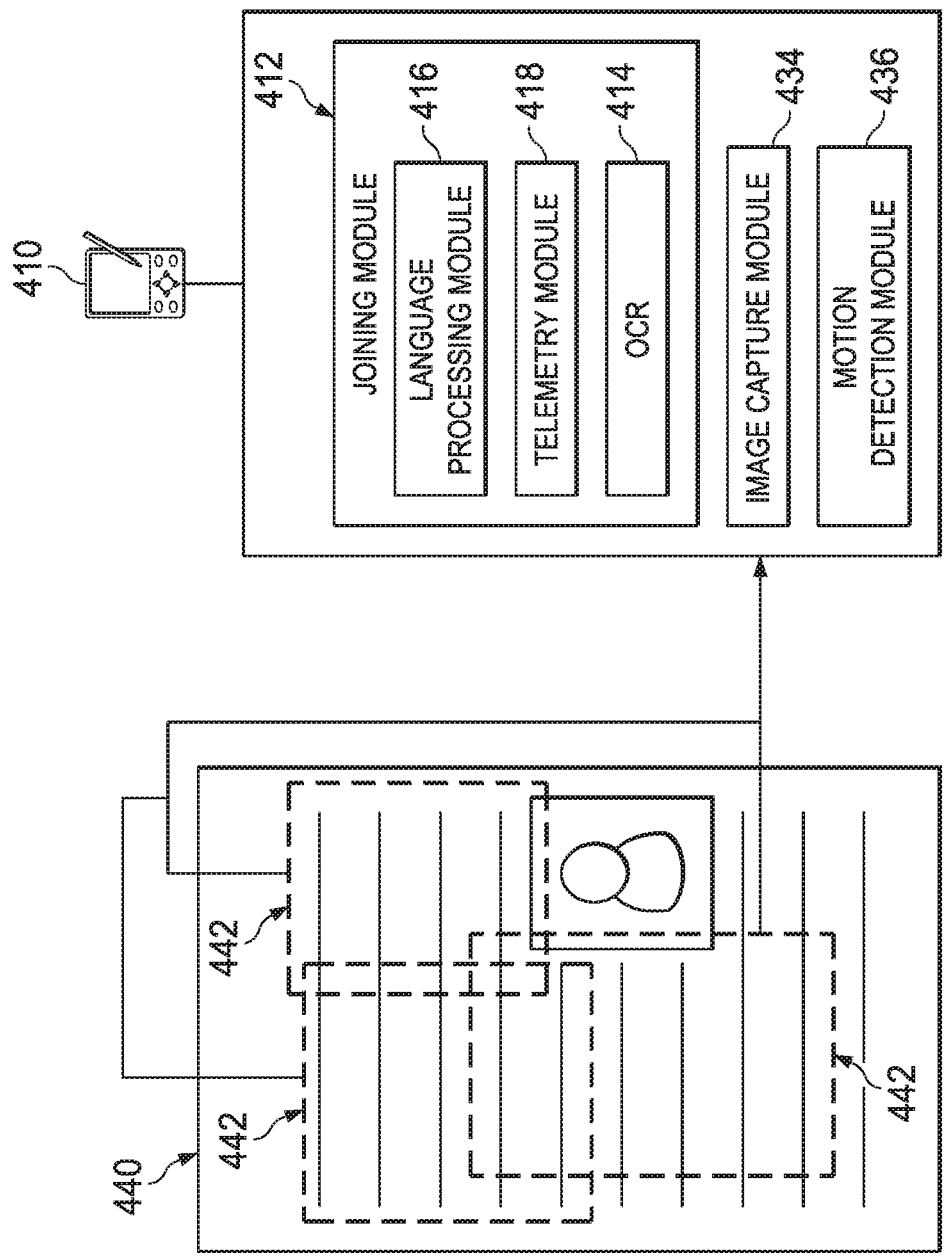
FIG. 4 is a block diagram illustrating one embodiment of a topology for on-device OCR.

It may now be helpful here to discuss embodiments of various topologies that may be utilized in performing embodiments as disclosed herein. Referring now to FIG. 4, one embodiment of a mobile device 410 configured to perform OCR is depicted. Mobile device 410 includes image capture module 434, motion detection module 436 and joining module 412.

Image capture module 434 may access a lens or other aperture configured to receive or capture images using the light received through the aperture, as discussed above. Motion detection module 436 may be a device configured to detect motion, speed, direction, orientation or other data associated with position or movement of mobile device 410, with the assistance of an accelerometer or the like.

Joining module 412 may include OCR module 414, language processing module 416 and telemetry module 418. OCR module 414 is configured to perform OCR on an image, where the results of the OCR of an image is text corresponding to that image.

Language processing module 416 may be configured to perform language processing (e.g., natural language processing) techniques to analyse how, and if, text is to be joined. For example, overlapping text (e.g., words, phrases, portions of words or phrases, numbers, etc.) in the text obtained from different images may be used to determine which texts should be joined and where these texts should be joined. For example, the language processing module 416 may be configured to perform the search and evaluation techniques as described above. Additionally, in some embodiment, in a similar manner to how predictive text on mobiles works (e.g., using an appropriate language database) language processing module 416 may determine a probability of a match between two texts by analysing the likelihood of one text (or portion thereof) following another text (or portion thereof).

Telemetry module 418 may be configured to receive or determine motion, speed, direction, orientation, etc. data (collectively motion data) associated with images received at joining module. Telemetry module 418 may utilize motion data received directly from motion detection module 436 in conjunction with an image or determine such motion data (e.g., algorithmically) from, for example, image data or other motion data associated with the images. The telemetry module 418 may be configured to determine, based on the motion data received or obtained, an order of the images received at joining module 412.

Joining module 412 may thus be configured to receive a set of images 442 associated with a document 440 from image capture module 434 along with, in some embodiments, motion data associated with the images from motion detection module 436. Joining module 412 may be further configured to provide such images to OCR module 414 to obtain text associated with each of the images. Joining module 412 may then be configured to use language processing module 416 to determine which of the texts to join (if any) and where to join the text. Joining module 412 may also, in some embodiments, use motion data from telemetry module 416 corresponding to the images from which the texts were obtained to determine which of the text to join or where to joining the texts.

Once joining module 412 has determined which texts are to be joined and where those texts are to be joined, joining module 412 may join the texts to produce a single overall text corresponding to images 442 from the document 440. When joining the texts (e.g., at least two of the texts), joining module 412 may not utilize all the texts, may utilize only portions of certain texts, may remove duplicative (e.g., overlapping) text, etc.

Figure 5:
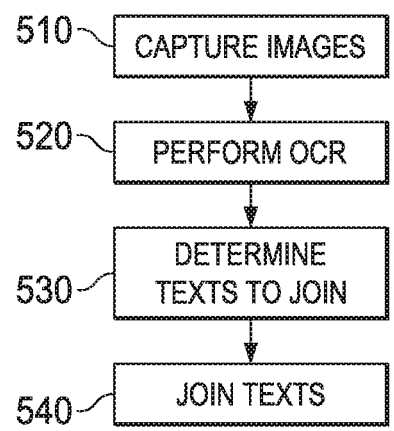
FIG. 5 is a flow diagram illustrating one embodiment of a method for on-device OCR.

One embodiment of a method for performing OCR on devices using multiple images is depicted in FIG. 5. Initially at step 510 a set of images may be captured form a document. This capture may be the reception of images (e.g., image data) corresponding to the images being received through an image capture device such as a camera or the like on the computing device. The images received may be captured based on input from the user (e.g., the user may point the computing device and select when an image is to be captured) or may be captured at certain intervals as, for example, a user moves the device over the document.

At step 520 OCR may be performed on the captured images. Performing OCR on the captured image may result in a text associated with each captured image. At step 530 a determination can be made which of those texts are to be joined together. This determination can be made, in one embodiment, by analyzing each of the texts to determine portions of the texts (e.g., words, phrases, numbers, etc.) that overlap (e.g., are the same or are a part of the same word, phrase or number, etc.). This analysis may also take into account the overlap between texts that occur at different lines of the text (e.g., an overlap between two texts may occur at multiple places and on multiple lines of the texts).

In some embodiments, the determination of which texts are to be joined may be made based on motion data. For example if it can be determined that a device was moving from left to right when image 1 and image 2 were taken, it may be the case that the text resulting from the OCR of image 1 should be joined to the text resulting from the OCR of image 2.

Additionally, predictive linguistics may be used to determine which texts should be joined. Such predictive linguistics may be used, for example, to determine a likelihood that a word or phrase of one text would follow a word of phrase of another text.

Once a determination is made which texts should be joined, these texts may be joined at step 540. This joining process may join texts in such a way that duplicative text may be removed and at least two of the texts (or portions thereof) joined to form a single overall text corresponding to the captured images.

Figure 6:
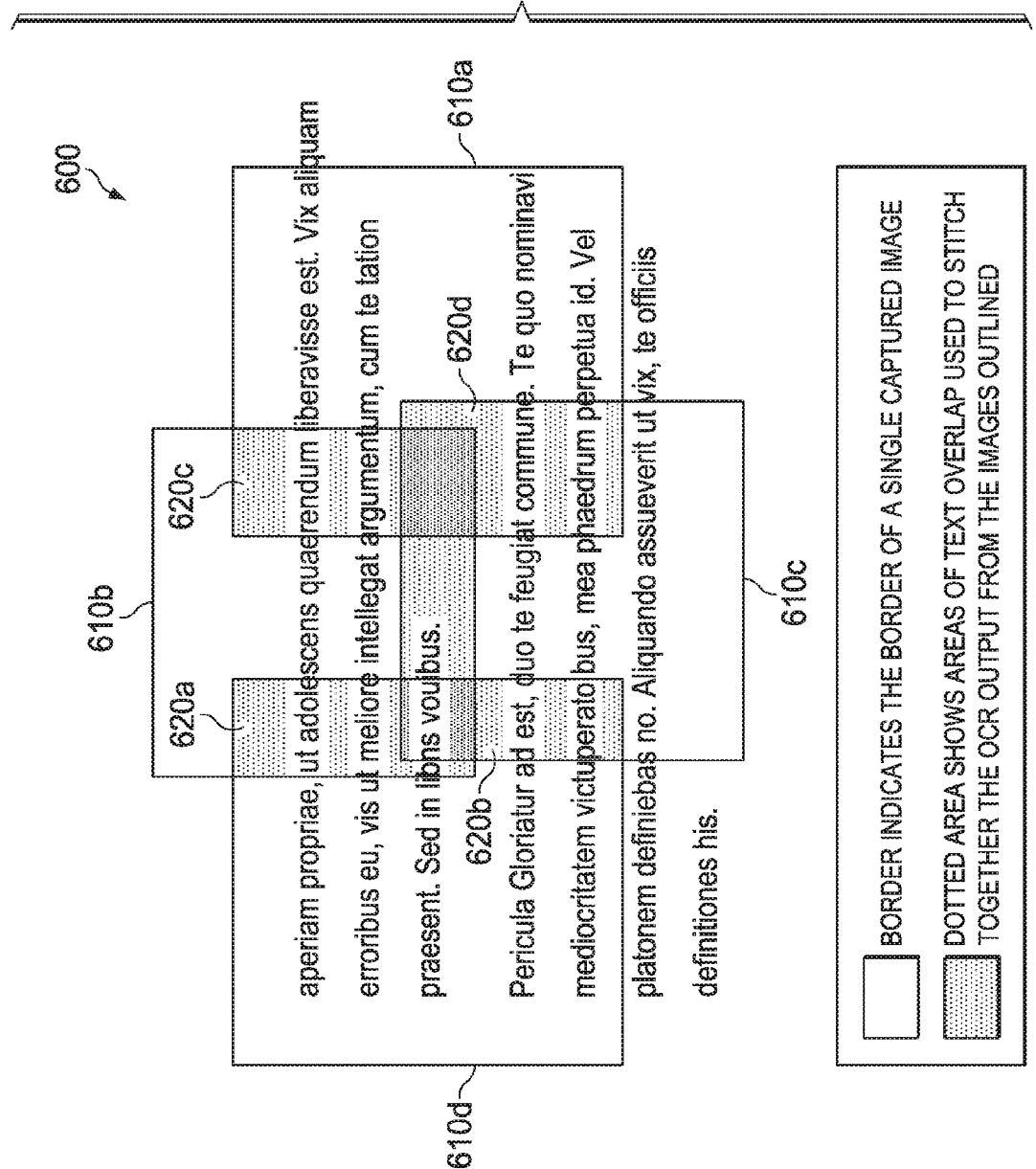
FIG. 6 is a depiction of an example document.

The joining of texts obtained from different images taken from the same document may be better understood with reference to FIG. 6. In the example illustrated, images 610 may be captured from document 600. Areas 620 may include overlapping text that may be obtained from each of these images 610 that may be used to determine which texts to join. For example, notice that image 610*a* includes the text "t commune. Te quo nominavi" and "haedrum perpetua id. Vel" while image 610*c* includes the text "d est, duo to feugiat commun" and "peratoribus, mea phaedrum p". Thus, as depicted in area 620*d* the text of image 610*c* and the text of image 610*a* may be determined to comprise the overlapping text "t commun" and "haedrum p". Accordingly, it can be determined that the text from these images 610*a*, 610*c* should be joined based on this overlapping text and when the text of the images 610*a*, 610*c* are joined it may result in the text "d est, duo te feugiat commune. Te quo nominavi" and "peratoribus, mea phaedrum perpetua id. Vel".

Similarly, then, an OCR of image 610*d* includes the text "Pericula gloriatur ad est," and "mediocritatem vituperato" while image 610*c* includes the text "d est, duo te feugiat commun" and "peratoribus, mea phaedrum p". Thus, as depicted in area 620*b* the text of image 610*d* and the text of image 610*c* may be determined to comprise the overlapping text "d est," and "perato". Accordingly, it can be determined that the text from these images 610*d*, 610*c* should be joined based on this overlapping text and, when the text of the images 610*d*, 610*c* are joined it may result in the text "Pericula gloriatur ad est, duo te feugiat commun" and "mediocritatem vituperatoribus, mea phaedrum p". Furthermore, as discussed above, it may have been determined that the text from images 610*c* and 610*a* should also be joined based on overlapping text within those images. As such, when the text from image 610*d* is joined to the text from image 610*c* and the text from image 610*c* is joined to the text from image 610*a* it may result in the text "Pericula gloriatur ad est, duo te feugiat commune. Te quo nominavi" and "mediocritatem vituperatoribus, mea phaedrum perpetua id. Vel".

Examples of text that may be used to join text of image 610*d* to text of image 610*b* is depicted in area 620*a* and examples of text that may be used to join text of image 610*b* to text of image 610*a* is depicted in area 620*c*.

Figure 7:
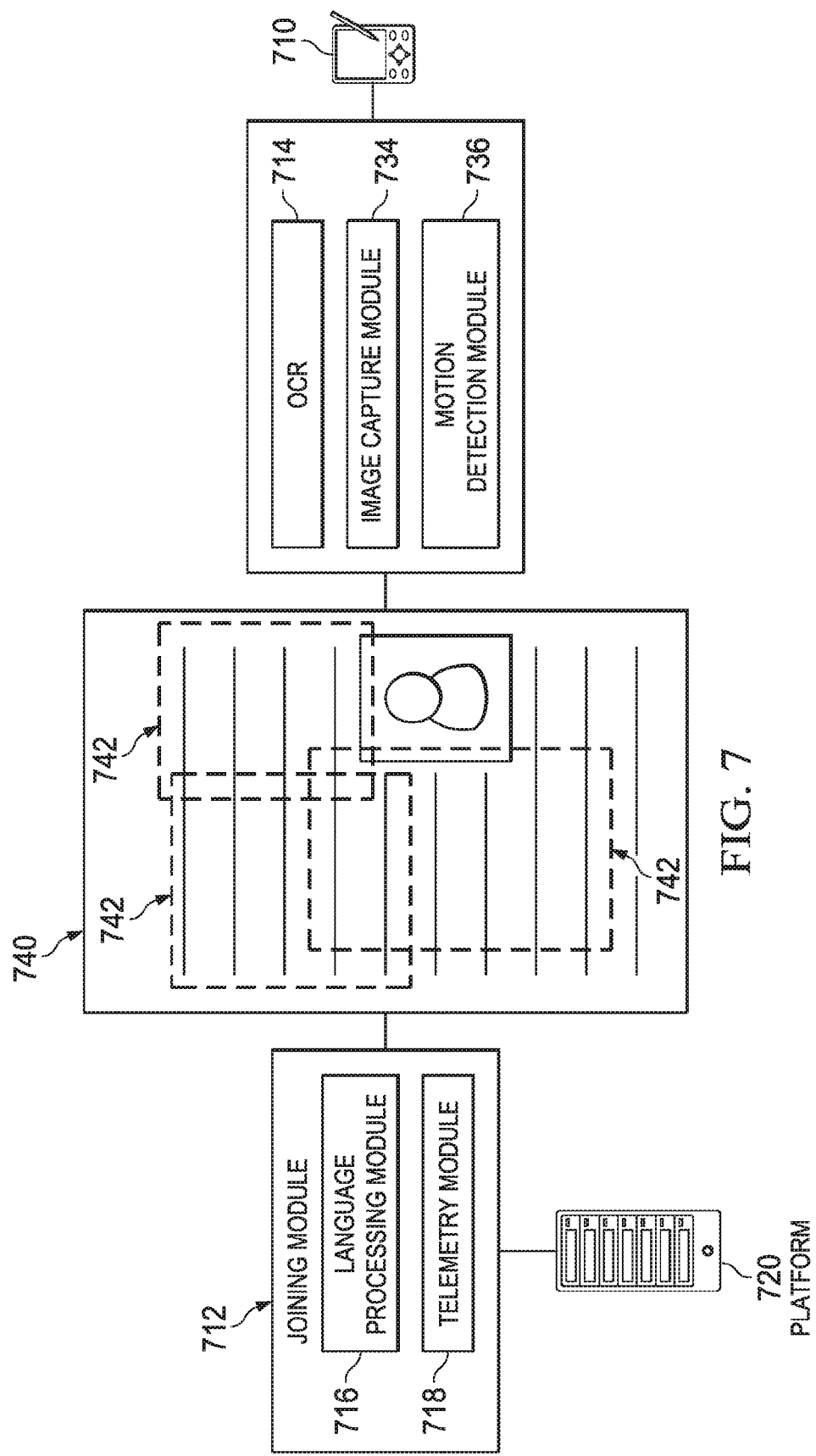
FIG. 7 is a block diagram illustrating one embodiment of a topology for on-device OCR.

Referring to FIG. 7, another embodiment of topology for OCR of documents is illustrated. The topology includes one or more computing devices 710 connected to a content provisioning platform 720 over a network. The network may be a wired or wireless network such as the Internet, an intranet, a LAN, a WAN, a cellular network, another type of network. It will be understood that the network may be a combination of multiple different kinds of wired or wireless networks. In this embodiment, however, the joining is performed at platform 720. Mobile device 710 includes image capture module 734, OCR module 714, and motion detection module 736.

Image capture module 734 may access a lens or other aperture configured to receive or capture images using the light received through the aperture, as discussed above. Motion detection module 736 may be a device configured to detect motion, speed, direction, orientation or other data associated with position or movement of mobile device 710, with the assistance of an accelerometer or the like. OCR module 714 is configured to perform OCR on an image, where the results of the OCR of an image is text corresponding to that image.

The back end platform 720 may receive the image capture, OCR, and motion detection data from the mobile device 710 over a network, such as the Internet or the like. The back end platform 720 includes a joining module 712. Joining module 712 may include language processing module 716 and telemetry module 718.

Language processing module 716 may be configured to perform language processing (e.g., natural language processing) techniques to analyze how, and if, text is to be joined. For example, overlapping text (e.g., words, phrases, portions of words or phrases, numbers, etc.) in the text obtained from different images may be used to determine which texts should be joined and where these texts should be joined. For example, the language processing module 716 may be configured to perform the search and evaluation techniques as described above. Additionally, in some embodiment, in a similar manner to how predictive text on mobiles works (e.g., using an appropriate language database) language processing module 716 may determine a probability of a match between two texts by analyzing the likelihood of one text (or portion thereof) following another text (or portion thereof).

Telemetry module 718 may be configured to receive or determine motion, speed, direction, orientation, etc. data (collectively motion data) associated with images received at the joining module. Telemetry module 718 may utilize motion data received directly from motion detection module 736 in conjunction with an image or determine such motion data (e.g., algorithmically) from, for example, image data or other motion data associated with the images. The telemetry module 718 may be configured to determine, based on the motion data received or obtained, an order of the images received at joining module 712.

Joining module 712 may thus be configured to receive a set of images 742 associated with a document 740 from image capture module 734 along with, in some embodiments, motion data associated with the images from motion detection module 736, as well as text associated with each of the images from the OCR module 714. Joining module 712 may then be configured to use language processing module 716 to determine which of the texts to join (if any) and where to join the text. Joining module 712 may also, in some embodiments, use motion data from telemetry module 716 corresponding to the images from which the texts were obtained to determine which of the text to join or where to joining the texts.

Once joining module 712 has determined which texts are to be joined and where those texts are to be joined, joining module 712 may join the texts to produce a single overall text corresponding to images 742 from the document 740. When joining the texts (e.g., at least two of the texts), joining module 712 may not utilize all the texts, may utilize only portions of certain texts, may remove duplicative (e.g., overlapping) text, etc.

Figure 8:
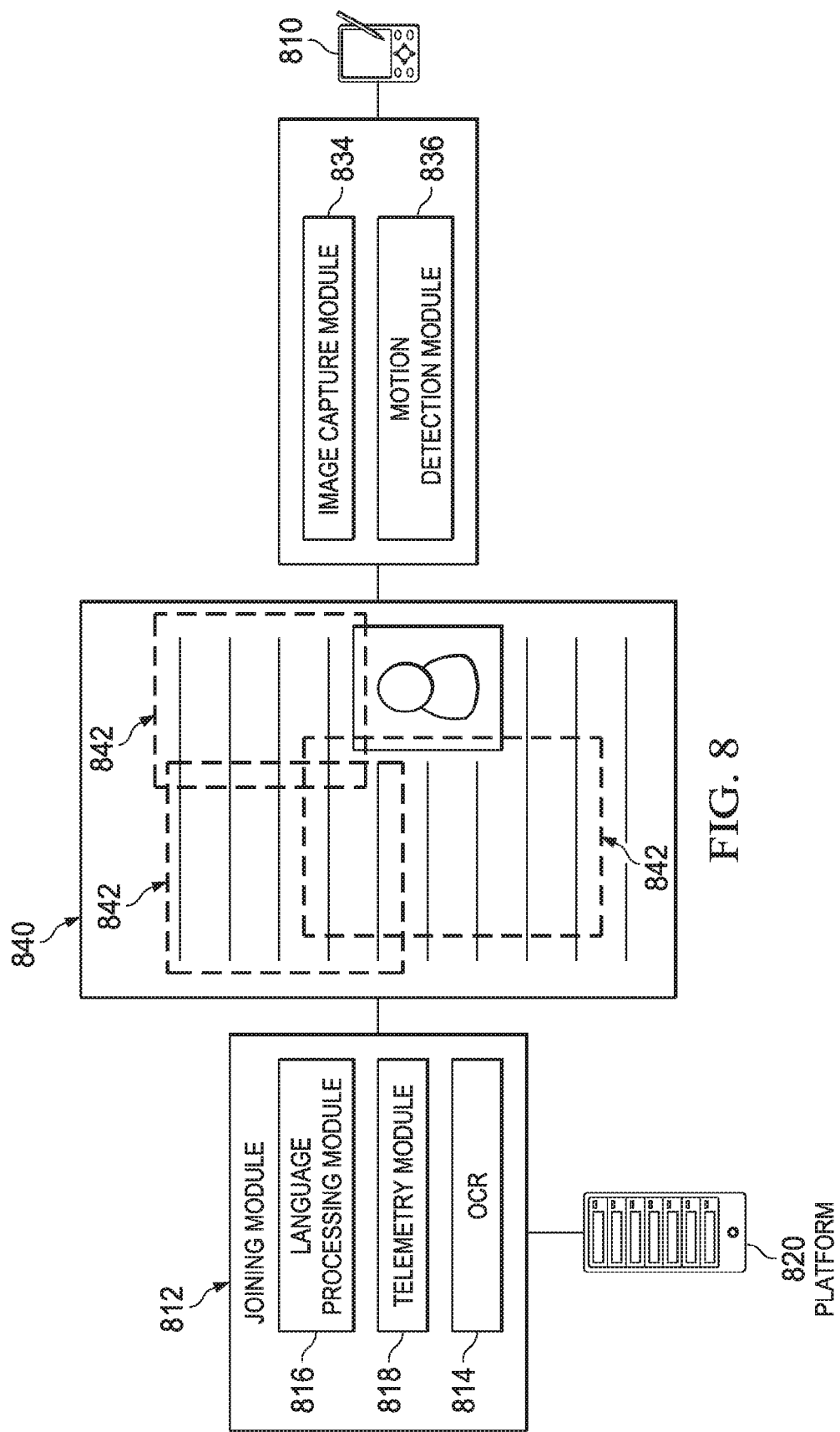
FIG. 8 is a block diagram illustrating one embodiment of a topology for back end OCR.

Another embodiment of a topology for OCR of documents is illustrated in FIG. 8. The topology includes one or more computing devices 810 connected to a content provisioning platform 820 over a network. The network may be a wired or wireless network such as the Internet, an intranet, a LAN, a WAN, a cellular network, another type of network. It will be understood that the network may be a combination of multiple different kinds of wired or wireless networks. In this embodiment, the OCR and joining are performed at platform 820. Mobile device 810 includes image capture module 834, OCR module 814, and motion detection module 836.

Mobile device 810 includes image capture module 834 and motion detection module 836. Image capture module 834 may access a lens or other aperture configured to receive or capture images using the light received through the aperture, as discussed above. Motion detection module 836 may be a device configured to detect motion, speed, direction, orientation or other data associated with position or movement of mobile device 810, with the assistance of an accelerometer or the like.

The back end platform 820 may receive the image capture and motion detection data from the mobile device 810 over a network, such as the Internet or the like. The back end platform 820 includes a joining module 812. Joining module 812 may include language processing module 816, OCR module 814, and telemetry module 818. OCR module 814 is configured to perform OCR on an image, where the result of the OCR of an image is text corresponding to that image.

Joining module 812 may include OCR module 814, language processing module 816 and telemetry module 818. OCR module 814 is configured to perform OCR on an image, where the results of the OCR of an image is text corresponding to that image.

Language processing module 816 may be configured to perform language processing (e.g., natural language processing) techniques to analyze how, and if, text is to be joined. For example, overlapping text (e.g., words, phrases, portions of words or phrases, numbers, etc.) in the text obtained from different images may be used to determine which texts should be joined and where these texts should be joined. For example, the language processing module 816 may be configured to perform the search and evaluation techniques as described above. Additionally, in some embodiment, in a similar manner to how predictive text on mobiles works (e.g., using an appropriate language database) language processing module 816 may determine a probability of a match between two texts by analyzing the likelihood of one text (or portion thereof) following another text (or portion thereof).

Telemetry module 818 may be configured to receive or determine motion, speed, direction, orientation, etc. data (collectively motion data) associated with images received at joining module. Telemetry module 818 may utilize motion data received directly from motion detection module 836 in conjunction with an image or determine such motion data (e.g., algorithmically) from, for example, image data or other motion data associated with the images. The telemetry module 818 may be configured to determine, based on the motion data received or obtained, an order of the images received at joining module 812.

Joining module 812 may thus be configured to receive a set of images 842 associated with a document 840 from image capture module 834 along with, in some embodiments, motion data associated with the images from motion detection module 836. Joining module 812 may be further configured to provide such images to OCR module 814 to obtain text associated with each of the images. Joining module 812 may then be configured to use language processing module 816 to determine which of the texts to join (if any) and where to join the text. Joining module 812 may also, in some embodiments, use motion data from telemetry module 816 corresponding to the images from which the texts were obtained to determine which of the text to join or where to joining the texts.

Once joining module 812 has determined which texts are to be joined and where those texts are to be joined, joining module 812 may join the texts to produce a single overall text corresponding to images 842 from the document 840. When joining the texts (e.g., at least two of the texts), joining module 812 may not utilize all the texts, may utilize only portions of certain texts, may remove duplicative (e.g., overlapping) text, etc.

It is noted that various other configurations of the joining and OCR may be implemented. For example, in some embodiments, the image and/or telemetry data may be sent from the mobile device 810 to the platform 420, which then performs the OCR. The platform may then send the results of the OCR and other analysis to the user device 810 which may then perform the joining.

Figure 9:
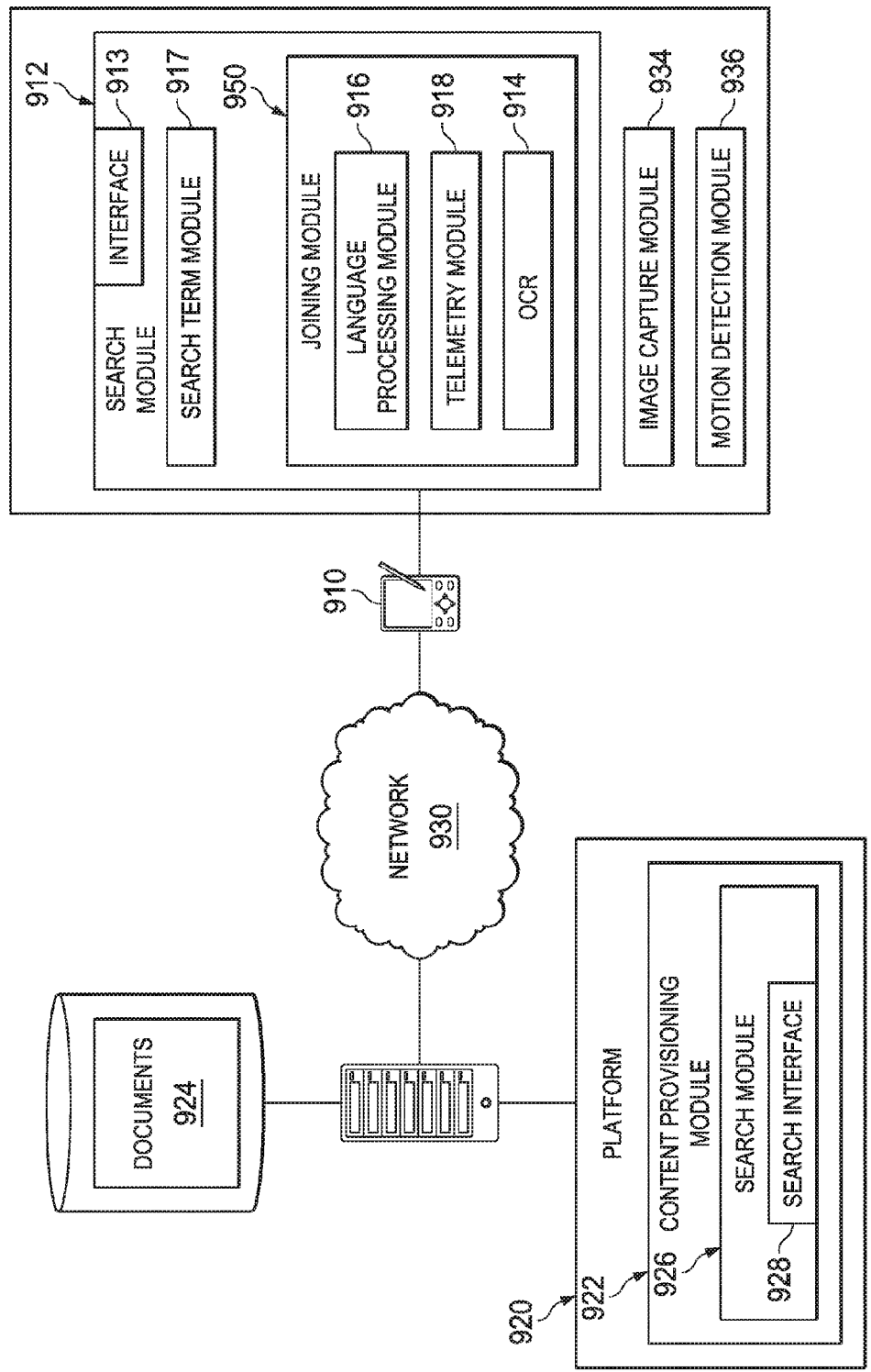
FIG. 9 is a block diagram illustrating one embodiment of a topology for document searching.

As can be seen then, certain embodiments may provide improved methods for performing OCR on computing devices. Such embodiments may be usefully applied in systems and methods for document searching. FIG. 9 depicts one embodiment of a topology for document searching that includes the joining of texts. The topology includes one or more computing devices 910 connected to a content provisioning platform 920 over a network 930. The network 930 may be a wired or wireless network such as the Internet, an intranet, a LAN, a WAN, a cellular network, another type of network. It will be understood that network 930 may be a combination of multiple different kinds of wired or wireless networks.

Platform 920 may include one or more servers providing content provisioning modules 922 accessible at one or more locations (e.g., IP addresses or domain names) or through one or more interfaces. The content provisioning module 922 of a platform 920 may support access from a computing device 910. Content provisioning module 922 may include search module 926 including search interface 928 to allow for searching of such documents 924. Search interface 928 may be accessible (e.g., at a particular URL, through an API or web services interface, etc.) such that a query including one or more search terms may be provided through the search interface 928. The search module 926 may search the documents 924 based on the query provided through the search interface 926 to determine a set of results responsive to the query. These results can then be returned by the search interface 928 in response to the query.

Each computing device may include an image capture module 934, motion detection module 936 and a search module 912. Image capture module 934 may include a lens or other aperture and be configured to receive or capture images using the light received through the aperture. For example, many mobile computing devices include a cameras lens or the like and an associated image capture module. Thus, image capture module 934 may, when utilized, receive image data (with or without direct user involvement)

through the aperture of the device 910 and capture or otherwise provide these images. Motion detection module 936 may be a device configured to detect motion, speed, direction, orientation or other data associated with position or movement of mobile device 910, such as an accelerometer or the like.

Search module 912 may include interface 913, joining module 950 and search term module 917. Interface 913 may have access to one or more input or output modules (e.g., a screen, buttons, speakers, etc.) on device 910 and be configured to provide output or receive input through these input or output modules of the device 910. Interface 913 may also be configured to utilize other interfaces such as APIs, web service interfaces, etc. to send requests and receive responses to those requests.

Specifically, in one embodiment, interface 913 may be configured to be accessed by a user such that the image currently being received by image capture module 934 is displayed on the screen of the mobile computer device 910. In one embodiment, then, interface 913 may allow a user to indicate that images (e.g., images captured while a user is moving the device 910 over the document) is to be used for a search when activated by a user (e.g., when the user selects a particular button or touches a screen in a particular place, etc.). Interface 913 may also be configured to present the results of a search to a user (e.g., in conjunction with an image being displayed to the user or in another type of interface altogether).

Search term module 917 is configured to determine one or more search terms from text. Search term module 917 may utilize, for example, language processing module 916 or the like configured to remove stop words from the text, determine key words or phrases, performing key word or term weighting, etc. Thus, search term module 917 may determine a set of search terms from text by, for example, using all the text (e.g., each term of the text is a search term, or the entire text is one search term), using a set of key words or phrases determined form the text, using the words of the text after removal of stop words, or by determining the set of search terms in some other manner.

Joining module 912 may include OCR module 914, language processing module 916 and telemetry module 918. OCR module 914 is configured to perform OCR on an image, where the results of the OCR of an image is text corresponding to that image.

Language processing module 916 may be configured to perform language processing (e.g., natural language processing) techniques to analyse how, and if, text is to be joined. For example, overlapping text (e.g., words, phrases, portions of words or phrases, numbers, etc.) in the text obtained from different images may be used to determine which texts should be joined and where these texts should be joined. Additionally, in some embodiment, in a similar manner to how predictive text on mobiles works (e.g., using an appropriate language database) language processing module 916 may determine a probability of a match between two texts by analysing the likelihood of one text following another text.

Telemetry module 918 may be configured to receive or determine motion, speed, direction, orientation, etc. data (collectively motion data) associated with images received at joining module. Telemetry module 918 may utilize motion data received directly from motion detection module 936 in conjunction with an image or determine such motion data (e.g., algorithmically) from, for example, image data or other motion data associated with the images.

Joining module 912 may thus be configured to receive a set of images associated with a document along with, in some embodiments, motion data associated with the images from motion detection module 936. Joining module 912 may be further configured to provide such images to OCR module 914 to obtain text associated with each of the images. Joining module 912 may then be configured to use language processing module 916 to determine which of the texts to join (if any) and where to join the text. Joining module 912 may also, in some embodiments, use motion data from telemetry module 918 corresponding to the images from which the texts were obtained to determine which of the text to join or where to joining the texts.

Search module 912 is thus configured to be activated and to access image capture module 934 to obtain images (e.g., image data) from image capture module 934 and provide these images to interface 913 to be presented to the user. Search module 912 is also configured to receive an indication that a user wishes to perform a search based on the document (e.g., as the user moves his device 910 over the document). The search module 912 is thus configured to provide multiple images to joining module 950, receive the overall text associated with the multiple images from the joining module 950, provide the text to search term module 917, receive the search terms from search term module 917, use interface 913 to provide the search terms to search module 926, receive the results of the search from interface 913 and present the results of the search using interface 913.

Accordingly, a user of computing device 910 may wish to perform a search of documents 924 and activate search module 912 on computing device 910. Search module 912 may then activate image capture module 934 on the device 910 and present the image begin received by image capture module 934 to the user through interface 913. The user may then move the device 910 over the document. At a certain interval then, the search module 112 may capture multiple images received from image capture module 934.

Search module 912 may then provide these multiple images to joining module 950 which may then OCR on each of these images top determine text for each of these images and determine if and where these text should be joined and join the texts accordingly to generate a single overall text. The single overall text may be provided to search module 912. Search module 912 may then determine a set of search terms from the single overall text.

Once the set of search terms are determined, search module 912 may use interface 913 to provide these search terms to search interface 928 of search module 926 of content provisioning module 922. For example, the search terms may be provided to the search module 926 through search interface 928 using an API or web services interface provided by search interface 928. Search module 926 may then utilize the provided search terms to search the documents 924 to obtain a set of search results, where the search results are associated with documents 924 responsive to the search. These results may be returned to interface 913 through search interface 928 of search module 926 (e.g., in response to the API or web services call received from interface 913).

When the results are received by interface 913 they may be presented to the user at the device 910. For example, a list of the titles or links to each document returned as a search result (or a subset thereof) may be presented allowing a user to select the title and view the corresponding document (e.g., by accessing the document stored on device 910 or by accessing content provisioning module 920 with an identifier of the desired document, etc.).

It can be appreciated that other search systems may also be implemented. In some embodiments, the platform can provide one or more of a joining module, search module, search term module, feature recognition module, or NLP module. The client computing device sending search information to the platform, where the search information includes information to be processed into a search (e.g., one or more of an image, feature of a document, search term or other information).

Routines, methods, functions, steps, operations or portions thereof described herein can be implemented through control logic adapted to direct a computing device to perform the routines, methods, functions, steps, operations or portions thereof. Control logic can include computer executable instructions stored on a computer readable medium that can be operated on by a processor, hardware, firmware or a combination thereof. The control logic can include, in some embodiments, application specific integrated circuits, programmable logic devices, field programmable gate arrays, optical, chemical, biological, quantum or nanoengineered systems, components and mechanisms. Any suitable language can be used. Different programming techniques can be employed such as procedural or object oriented. Based on the disclosure and teachings provided herein, a person of ordinary skill in the art will appreciate other ways and/or methods to implement the invention.

Any particular step, operation, method, routine, operation or portion thereof can execute on a single computer processing device or multiple computer processing devices, a single computer processor or multiple computer processors. Data may be stored in a single storage medium or distributed through multiple storage mediums, and may reside in a single database or multiple databases (or other data storage). The sequence of operations described herein can be interrupted, suspended, or otherwise controlled by another process, such as an operating system, kernel, etc.

A "computer-readable medium" may be any type of data storage medium that can store computer instructions, including, but not limited to read-only memory (ROM), random access memory (RAM), hard disks (HD), data cartridges, data backup magnetic tapes, floppy diskettes, flash memory, optical data storage, CD-ROMs, or the like. The computer readable medium may include multiple computer readable media storing computer executable instructions, such as in a distributed system or instructions stored across an array.

A "processor" includes any hardware system, hardware mechanism or hardware component that processes data, signals or other information. A processor can include a system with a central processing unit, multiple processing units, dedicated circuitry for achieving functionality, or other systems. A processor can perform its functions in "real-time," "offline," in a "batch mode," etc. Portions of processing can be performed at different times and at different locations, by different (or the same) processing systems.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Communications between computers implementing embodiments of the invention can be accomplished using any electronic, optical, radio frequency signals, or other suitable methods and tools of communication in compliance with network and other communications protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. Moreover, it will be appreciated that in some instances some features of embodiments of the invention will be employed without a corresponding use of other features without departing from the scope and spirit of the invention as set forth.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

It is to be understood that other variations and modifications of the embodiments described and illustrated herein are possible in light of the teachings herein and are to be considered as part of the spirit and scope of the invention. Thus, while the invention has been described herein with reference to particular embodiments thereof, a latitude of modification, various changes and substitutions are intended in the foregoing disclosures, and therefore, many modifications may be made to adapt a particular situation or material to the essential scope and spirit of the invention. Accordingly, the specification, including the Summary and Abstract, and figures are to be regarded in an illustrative rather than a restrictive sense, and all such modifications are intended to be included within the scope of invention.

What is claimed is:

1. A method for document searching, comprising:
    receiving, by a server, first search information from a device, the first search information derived from a first image, the first image captured with a camera of the device, the first image comprising a first portion of a document;
    performing, by the server, a first search on a set of documents based on the first search information;
    the server sending a first result from the first search to the device, wherein the first result is presented on the device;
    receiving, by the server, second search information from the device, the second search information derived from joining the first image and a second image, the second image captured with the camera of the device after a movement of the device, the second image comprising a second portion of the document;
    performing, by the server, a second search of the set of documents based on the second search information;
    the server updating the first result using the second search information to form a second result; and
    the server sending the second result to the device, wherein the first result on the device is replaced with the second result.

2. The method of claim 1, wherein the first image and the second image are joined by searching for commonly found words in different portions of the first and second search information.

3. The method of claim 1, wherein the first image and the second image are joined by evaluating probability of text from the first image and the second image matching.

4. The method of claim 1, wherein motion data associated with the first image and the second image is used in joining the first image with the second image.

5. The method of claim 4, wherein at least some of the motion data is determined by an accelerometer of the device.

6. The method of claim 4, wherein the motion data is determined algorithmically from data from the first image and the second image.

7. The method of claim 4, wherein the motion data includes speed data or direction data.

8. The method of claim 4, wherein the motion data includes orientation data.

9. The method of claim 1, wherein the first search information or the second search information includes: formatting, logos, graphics, or a whitespace fingerprint.

10. The method of claim 1, wherein the first search information or the second search information includes search terms.

11. A system for document searching, comprising:
    a server having a processor and a non-transitory computer readable medium storing a set of computer instructions executable by the processor to:
    receive first search information from a device, the first search information derived from a first image, the first image captured with a camera of the device, the first image comprising a first portion of a document;
    perform a first search on a set of documents based on the first search information;
    send a first result from the first search to the device, wherein the first result is presented on the device;
    receive second search information from the device, the second search information derived from joining the first image and a second image, the second image captured with the camera of the device after a movement of the device, the second image comprising a second portion of the document;
    perform a second search of the set of documents based on the second search information;
    update the first result using the second search information to form a second result; and
    send the second result to the device, wherein the first result on the device is replaced with the second result.

12. The system of claim 11, wherein the first image and the second image are joined by searching for commonly found words in different portions of the first and second search information.

13. The system of claim 11, wherein the first image and the second image are joined by evaluating probability of text from the first image and the second image matching.

14. The system of claim 11, wherein motion data associated with the first image and the second image is used in joining the first image with the second image.

15. The system of claim 14, wherein at least some of the motion data is determined by an accelerometer of the device.

16. The system of claim 14, wherein the motion data is determined algorithmically from data from the first image and the second image.

17. The system of claim 14, wherein the motion data includes speed data or direction data.

18. The system of claim 14, wherein the motion data includes orientation data.

19. The system of claim 11, wherein the first search information or the second search information includes: formatting, logos, graphics, or a whitespace fingerprint.

20. The system of claim 11, wherein the first search information or the second search information includes search terms.

* * * * *